United States Patent [19]

Neefe

[11]  4,434,113
[45]  Feb. 28, 1984

[54] SPIN CASTING LENSES HAVING REDUCED SPHERICAL ABERRATION

[76] Inventor: Charles W. Neefe, P.O. Box 429, 811 Scurry St., Big Spring, Tex. 79720

[21] Appl. No.: 397,845

[22] Filed: Jul. 13, 1982

[51] Int. Cl.³ ............................................. B29D 11/00
[52] U.S. Cl. ..................................... 264/2.1; 264/2.5; 425/808
[58] Field of Search ................... 264/2.1, 2.5; 425/808

[56] References Cited

U.S. PATENT DOCUMENTS

| 3,428,533 | 2/1969 | Pichel | 264/2.1 |
| 3,555,126 | 1/1971 | Gitson | 264/2.5 |
| 3,641,717 | 2/1972 | Neefe | 51/131.5 |
| 3,660,545 | 5/1972 | Wichterle | 264/2.1 |
| 3,691,263 | 9/1972 | Stoy et al. | 264/2.1 |
| 4,188,353 | 2/1980 | Neefe | 264/2.5 |

OTHER PUBLICATIONS

"Spincasting Contact Lenses", Coombs et al, *Optical Engineering*, vol. 15, No. 4 pp. 332–333 Jul.–Aug. 1976.

*Primary Examiner*—James B. Lowe

[57]  ABSTRACT

A method of making spin cast contact lenses having front and back aspheric surfaces and no effective refractive aspherosity when in place on a spherical cornea.

2 Claims, 5 Drawing Figures

SPIN CASTING LENSES HAVING REDUCED SPHERICAL ABERRATION

PRIOR ART

The art of spin casting contact lenses has been in use for nineteen years. The principal value of spin casting is its low cost and high production. The disadvantages are the lenses are not spherical and the aspheric surface is of a shape that increases spherical aberration. The exact shape is most difficult to describe due to its being formed by several forces including centrifugal force, surface tension, viscosity of the liquid and radius of the concave mold. The Panofocal concept described in U.S. Pat. No. 3,641,717 is widely used to reduce the effects of spherical aberration. The most frequent use of Panofocal lenses is to provide increased acuity for patients having astigmatism. The Panofocal aspheric surface is on the convex or plus lens surface and of longer radius toward the lens edge and reduces spherical aberration, improving the visual acuity of the wearer up to two lines Snellen. The aspheric surface formed on the concave or minus surface of a spin cast lens is also longer toward the edge, however, when the soft lens is placed on the eye, it results in a shorter radius toward the edge on the convex plus surface and greatly increases the spherical aberration effect. This has three disadvantages: (1) The usable optical zone in the center of the lens is reduced requiring the lens to center well. (2) The reduction in visual acuity due to increased spherical aberration effect. (3) Visual acuity will fluxuate with lens movement.

SUBJECT OF THE INVENTION

A method has been developed whereby the advantages of spin casting may be employed to produce lenses with reduced spherical aberration effect.

IN THE DRAWINGS

The current lens molds are fabricated from steel or glass, each mold is individually ground and polished to the required specifications. To achieve accurate reproduction of the aspheric molds is most difficult and expensive. This new process makes possible exact reproductions of the required aspheric curve and has many other distinct advantages which will become apparent from the following disclosure.

An object is to provide a process for making inexpensive aspheric molds which may be made to identical specifications.

Another object is to provide a process whereby master molds may be used to produce a large quantity of replica molds.

Figure 1:
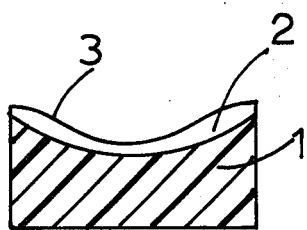
FIG. 1 shows the aspheric surface produced by spin casting.

The Molds are Made as Follows:

A resinous mold 1 FIG. 1 is made from a stable resin such as styrene or methyl methacrylate. A concave spherical surface 2 FIG. 1 is cut into the mold blank. The mold is then placed in the spin casting machine and a liquid monomer such as styrene or methyl methacrylate with catalyst sufficient to achieve polymerization is added and allowed to polymerize while rotating. The aspheric surface 3 FIG. 1 is produced. This aspheric surface will be used to produce a lens having no aspherosity when placed on a spherical cornea. This concave aspheric surface is used to make a convex aspheric metal mold capable of reproducing concave aspheric resin molds by injection or compression molding.

Figure 2:
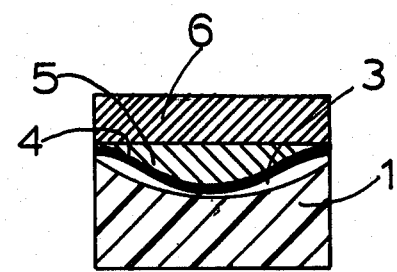
FIG. 2 shows the metal mold on the resin aspheric surface.

The Metal Mold is Made as Follows:

The aspheric surface 3 FIG. 2 is present on the resinous material 1 FIG. 2. A thin metal film 4 FIG. 2, is vacuum deposited on the aspheric optical surface 3 FIG. 2. Film 4 FIG. 2, is a hard metal such as chromium, nickel, platinum or tungsten. Vacuum disposition is accomplished by placing the surface to be coated in a vacuum chamber and removing air to obtain a high vacuum, the material to be deposited is heated to form a vapor or gas which fills the chamber and adheres to the surface of objects placed in the chamber. A heavy metal surface 5 FIG. 2, is electroplated on the thin film 4 FIG. 2. A material such as copper, nichel, or gold may be electroplated as a backing for the thin vacuum deposited film which acts as the electrical conductor, making the electroplating process possible. A metal carrier 6 FIG. 2, attached to the plated metal 5 FIG. 2, either by cement such as epoxy resin or metal solder.

The resinous lens blank 1 FIG. 2, may now be machined away, leaving a thin covering over the optical surface 3 FIG. 2. The remaining resinous material is dissolved away with a solvent such as acetone, chlorated hydrocarbons, ether, or other solvents exposing the metal optical surface 3 FIG. 3, which was formed by vacuum disposition of layer 4 FIGS. 2, and 3, and supported by layer 5 FIGS. 2 and 3 which were electroplated on the metalic film 4 FIGS. 2 and 3. The electroplated layer 5 FIGS. 2 and 3 is further supported and strengthened by the body 6 FIGS. 2 and 3.

Figure 3:
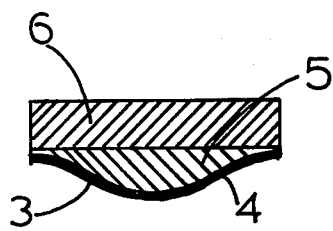
FIG. 3 shows the metal mold with the resin removed.
Figure 4:
FIG. 4 shows the molded resin mold before the lens is spun cast.

The finished metal mold FIG. 3 is now ready to be used to mold many aspherics concave optical surfaces 3 FIG. 4. Casting, compression molding or injection molding may be used to produce optical replicas from the finished metal mold.

Figure 5:
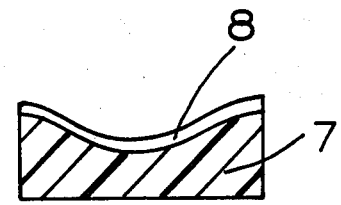
FIG. 5 shows the molded resin lens mold with the aspheric lens spun cast.

The aspheric resin mold 7 FIGS. 4 and 5 is placed in a spin cast machine and a lens 8 FIG. 5 is spun cast by rotating the mold 7 FIG. 5 to produce a concave aspheric lens surface with a correcting aspheric curve present on the convex surface. The soft contact lens made in this manner will have a spherical convex surface when in place on a spherical cornea.

It is understood that the degree or amount of aspherosity may be equal on both surfaces and the radius of curvature be different. This difference in radius of curvature provides the required refractive power for the contact lens. The equal amount of aspheric curvature reduces the refractive aberration caused by a shorter radius being present near the edge of the lens. This shorter radius toward the lens edge has the same optical effect as increasing spherical aberration. Improved image quality will result if the convex surface is not of shorter radius toward the edge of the lens when the lens is in place on the eye.

Various modifications can be made without departing from the spirit of this invention or the scope of the appended claims. The constants set forth in this disclosure are given as examples and are in no way final or binding. In view of the above, it will be seen that the several objects of the invention are achieved and other That which is claimed is:

1. Method of making a contact lens having equal convex and concave aspheric surfaces comprising the steps of (a) spin casting a soluble resinous material on a rotating mold of soluble resin having a spherical concave surface to form a layer having a concave aspheric surface produced by the physical forces acting on a rotating liquid, (b) depositing a metal film on the concave aspheric surfaced layer, (c) electroplating a supporting metal layer on the metal film, (d) removing the soluble resinous materials from the metal film, (e) molding a concave resinous aspheric surfaced optical replica against the convex aspheric surface of the metal film, (f) separating the metal film from the resinous optical replica, and (g) spin casting a contact lens on the concave aspheric surface of the resinous optical replica while it is rotating; said contact lens having an equal aspheric curve on the concave and convex lens surfaces.

2. A method as in claim 1 wherein the concave and convex aspheric quantities are equal and the radius are different.

* * * * *